Nov. 3, 1959        H. L. MYERS        2,911,360
REMOVING ACIDS FROM PETROLEUM
Filed Oct. 1, 1956
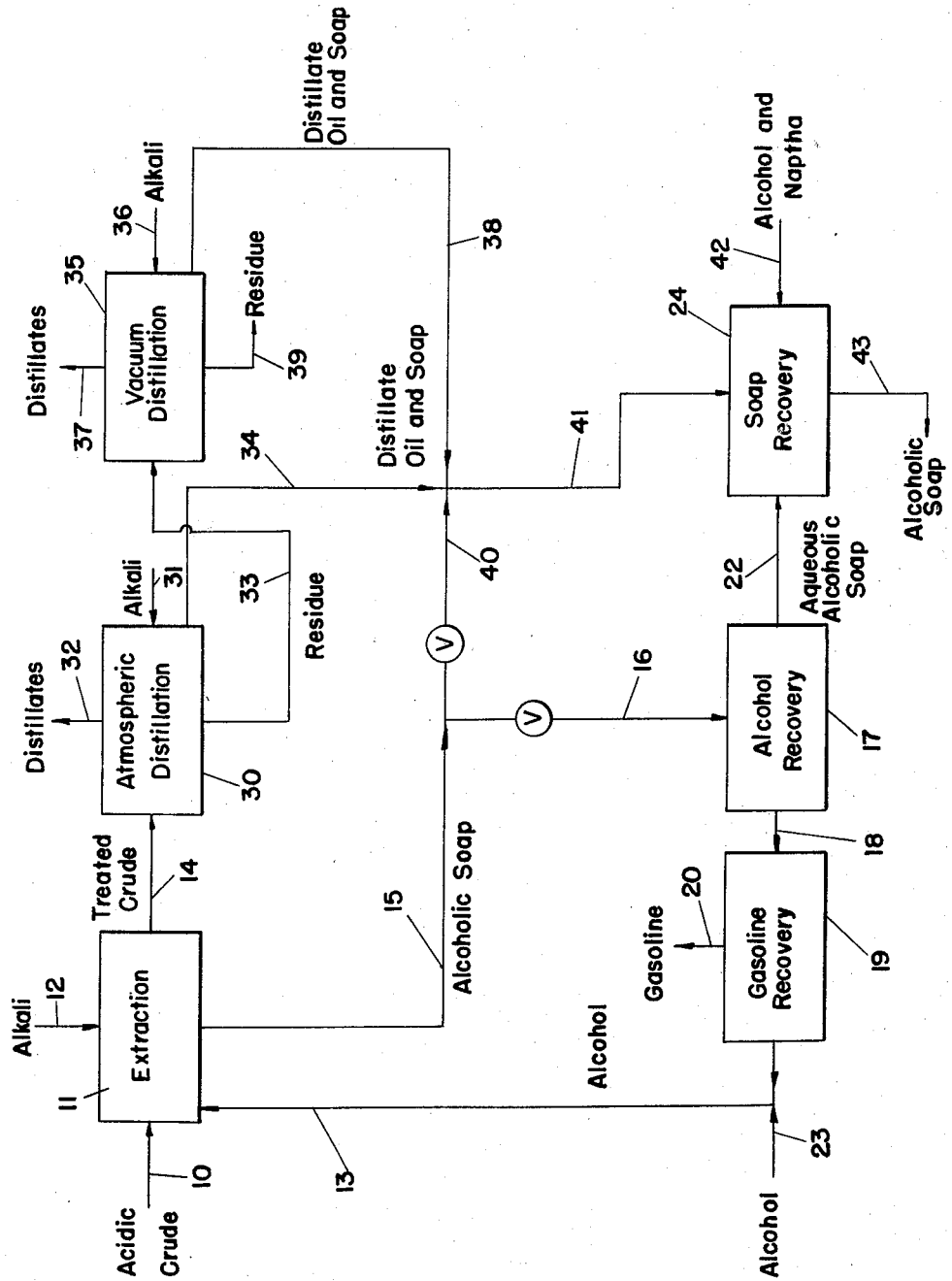
INVENTOR.
HUGH L. MYERS
BY Robert O. Spindle
ATTORNEY 2,911,360
Patented Nov. 3, 1959

2,911,360

REMOVING ACIDS FROM PETROLEUM

Hugh L. Myers, Springfield, Pa., assignor to Sun Oil Company, Philadelphia, Pa., a corporation of New Jersey Application October 1, 1956, Serial No. 613,311

8 Claims. (Cl. 208—263)

This invention relates to the removal of naphthenic acids and the obtaining of distillate oils from petroleum crudes or reduced crudes.

In many instances, petroleum crudes contain naphthenic acids which it is desirable to remove at some stage in the refining of the crude. It has been proposed previously to remove the naphthenic acids by contacting the crude in liquid phase with a basic material in the presence of an organic solvent such as alcohol, to form salts of the basic material with the naphthenic acids, which salts are extracted by the organic solvent. It has also been proposed to remove naphthenic acids by distilling crude or reduced crude to obtain vapors containing naphthenic acids, and contacting the vapors with a liquid alkaline treating agent, thereby to react the naphthenic acids with alkaline constituents of the treating agent. This type of operation is disclosed for example in United States application Serial No. 380,642, filed September 17, 1953, by Earl M. Honeycutt and Curtis C. Wallin, now Patent No. 2,770,580 issued November 13, 1956.

It has now been found that results unexpectedly superior to those obtained with either of the above refining processes can be obtained by a process wherein crude or reduced crude is first contacted in liquid phase with a basic material in the presence of aqueous alcohol solution, the resulting crude or reduced crude then being distilled and the vapors refined by means of a liquid alkaline treating agent. Salts of naphthenic acids with basic material can be recovered from the organic solvent used in the liquid phase treatment and also from the liquid alkaline material used in the vapor phase treatment. In one embodiment of the invention, superior results are obtained by employing a single naphthenic acid recovery operation for the naphthenate-containing products of both the liquid phase and the vapor phase treatment.

The liquid phase treatment preferably produces a crude or reduced crude product having A.S.T.M. neutralization number, in mg. of KOH per gram, which is 0.1 to 0.9 times, and preferably 0.25 to 0.75 times, the neutralization number of the charge stock. It has been found that the beneficially superior results according to the invention are obtained with such reduction in neutralization number, as compared to complete or more nearly complete removal of acidity by either the liquid phase treatment alone or the vapor phase treatment alone.

Too nearly complete removal of acidity by the liquid phase treatment gives inferior results to those obtained according to the invention in that superior color stability is obtained in the distillation of the crude or reduced crude when the vapors obtained in distillation are contacted with a liquid alkaline material comprising alkali metal naphthenates. If the removal of naphthenic acids is too nearly complete in the liquid phase operation, the amount of naphthenates present in the vapor phase operation will not be suitable for obtaining distillates having good color stability. The naphthenates are beneficial in the vapor phase operation as color stability improvers and also as dispersing agents for any alkali metal hydroxide which may be employed in the vapor phase operation.

In sufficient removal of acidity by the liquid phase operation, on the other hand, gives inferior results to those obtained according to the invention in that too large amounts of alkali metal naphthenates are formed in the vapor phase operation and produce deterimental results with regard to plugging of the vapor phase treating apparatus. These results, which are attributable at least in part to decomposition of alkali metal naphthenates at the high temperatures (575° F. to 725° F.) involved in the vapor phase operation, can be alleviated by using large amounts of liquid oil in the treating agent, but it is desirable to minimize as much as possible the amount of oil thus used.

The extent of removal of naphthenic acids in the liquid phase treating operation can be controlled by regulation of the amount of base employed and other conditions, in a manner within the ability of a person skilled in the art in the light of the disclosure in the present specification. The extent of removal is in any event less than the maximum that could be obtained.

The present invention provides an extent of removal of naphthenic acids prior to the vapor phase treatment which enables that treatment to be performed without excessive oil requirements for the treating agent and also without excessive decomposition of the organic materials in the treating agent and consequent plugging up of the vapor phase treating zone with solid carbonaceous decomposition products. The process of the invention also provides stable lubricating oil distillates and permits the refining of highly acidic crudes with the aforementioned benefits.

It is within the scope of the invention to remove more than 0.9 times the original acidity of the charge in the liquid phase operation, and blend back naphthenates in amount such that the alkali metal naphthenates introduced into the liquid alkaline material corresponds to 10 to 90 weight percent of the naphthenic acids in the charge stock. Thus, for example, if all of the naphthenic acids were removed as alkali metal naphthenates in the liquid phase operation, 10 to 90 percent of the resulting naphthenates could be introduced into the liquid alkaline material in the vapor phase operation.

Preferably, the liquid alkaline material in the vapor phase operation contains alkali metal hydroxide as well as alkali metal naphthenates, though in some cases the latter is sufficient.

The invention is particularly beneficial as applied to crudes or reduced crudes which have particularly high acidity, as indicated for example by neutralization number within the approximate range from 1.5 to 6 mg. of KOH per gram. Preferably, in such instances, the liquid phase treatment reduces the neutralization number to within the approximate range from 0.5 to 3 mg. of KOH per gram, and the subsequent vapor phase treating operation reduces the neutralization number to within the approximate range from 0 to 0.5 mg. of KOH per gram.

The basic material employed in the liquid phase treating operation is preferably used in an amount within the approximate range from 0.2 to 2.0 millimoles per 100 volumes of charge stock per unit of neutralization number of the charge stock in mg. of KOH per gram. The amount of basic material, otherwise expressed, is preferably within the approximate range from 0.1 to 2.0 weight percent based on charge stock.

Any suitable basic material, which is water soluble and alcohol soluble, can be employed in the liquid phase treating operation. Examples of suitable basic materials are alkali metal hydroxides such as sodium hydroxide, potassium hydroxide, etc., ammonia, organic nitrogen bases such as alkanol amines, ethanolamine, diethanolamine, dimethyl ethanolamine, etc. The organic solvent employed in the liquid phase treating operation is preferably a lower alkanol containing 1 to 3 carbon atoms, e.g. methanol, ethanol, isopropanol, although other low molecular weight oxygen-containing organic solvents, e.g. acetone, methyl ethyl ketone, can also be employed.

The organic solvent is employed as an aqueous solution having concentration preferably within the approximate range from 30 to 50 weight percent, and more preferably 35 to 45 weight percent. The amount of basic material used in the liquid phase treating operation is preferably within the approximate range from 0.1 to 5 weight percent, more preferably 1 to 3 weight percent, based on the aqueous solution of organic solvent.

If desired, a saturated hydrocarbon diluent, e.g. petroleum naphtha, aviation alkylate, etc., having an average number of carbon atoms within the approximate range from 5 to 10, can be employed in the liquid phase treating operation, for example in an amount equivalent to 50 to 100 volume percent based on charge.

The liquid phase treating operation is preferably carried out at a temperature within the approximate range from 50 to 200° F., and at atmospheric pressure, although higher pressures can be employed if desired.

In one embodiment of the process according to the invention, the solution of naphthenate salts in organic solvent which is obtained in the liquid phase treating operation is acidified, for example with sulfuric acid, to liberate naphthenic acids, which can be separated from the organic solvent by stratification, the separated organic solvent then being available for re-use in the liquid phase treating operation.

Alternatively, the solution of naphthenate salts in organic solvent obtained in the liquid phase treating operation can be distilled to obtain aqueous alcohol as distillate and a concentrated solution of naphthenate salts in water as residue. The distillation is preferably conducted in such a manner as to obtain in the residue an amount of alcohol, e.g. 1 to 10 volume percent (anhydrous basis) based on the naphthenate salts. In this way, a more fluid residue is obtained, facilitating further handling. The residue obtained in the distillation preferably contains 30 to 60 volume percent of naphthenate salts based on total residue.

Some lower molecular weight hydrocarbons, e.g. in the gasoline boiling range, which are extracted from the crude or reduced crude in the liquid phase treating operation, are distilled over with the aqueous alcohol, in a distillation as described in the preceding paragraph, and such hydrocarbons can be separated by stratification from the aqueous alcohol, thus recovering these hydrocarbons as a product of the process.

The crude or reduced crude, which has been subjected to the liquid phase treating operation, is distilled to obtain vapors containing naphthenic acids, the vapors then being contacted with a liquid alkaline treating agent. If desired, two distillations can be performed, the first to remove lower boiling fractions such as gasoline and gas oil, and the second constituting a redistillation under vacuum of the residue to obtain lubricating oil distillates. Where a reduced crude is employed as the original charge stock, the vacuum distillation alone is generally sufficient.

Where an entire crude is used as the original charge stock to the liquid phase treatment, a subsequent atmospheric pressure distillation in the absence of added alkali and a vacuum distillation in the presence of added alkali produces satisfactory results in the event that the liquid phase treatment removes the lower molecular weight naphthenic acids which would otherwise be removed in the atmospheric pressure distillation. The color and color stability of distillates produced in the atmospheric pressure distillation is in some instances not a problem, so that alkali can be dispensed with if not needed for neutralization of naphthenic acids in the vapors.

In the vacuum distillation, the charge stock is preferably heated to a temperature of from about 650° F. to 750° F. and introduced into a flash zone maintained at 25 to 100 mm. of Hg absolute. The contacting with liquid alkaline treating agent is preferably performed in a treating section above the flash zone and containing a plurality of distillation trays, the liquid alkaline treating agent passing downwardly from tray to tray, countercurrent to the rising vapors. The liquid temperature on the lowest tray of the treating section is preferably within the approximate range from 575° F. to 725° F., and more preferably 625° F. to 675° F.

The liquid alkaline treating agent removed from the lowest tray is preferably recycled in part to an upper tray of the treating section, the remainder of the removed treating agent being subjected to extraction with aqueous alcohol in order to remove naphthenate salts contained in the treating agent. The treating agent removed from the lowest tray generally contains liquid oil, e.g. 80 to 95%, and this oil can if desired be recycled to the treating section after extraction of naphthenate salts therefrom. However, such recycle is frequently not necessary because of the lower oil requirements for the treating agent in the process according to the invention.

Fresh basic material, e.g. alkali metal hydroxide, is introduced into the treating section in an amount sufficient to provide the desired removal of naphthenic acids from the vapors, and the necessary excess for obtaining stable lubricating oil distillates. The amount is preferably within the approximate range from 0.2 to 2.0 millimoles per 100 volumes original charge stock per unit of neutralization number of the original charge stock in mg. of KOH per gram. In the event that more than one distillation involving treatment of vapors with alkali is performed, the total amount of base employed in such distillations is preferably within the range stated in this paragraph.

After treatment with the liquid alkaline material, the vapors are subjected to rectification in a rectification section above the treating section in the distillation tower. The distillates obtained generally have neutralization number which is less than 0.5 times the neutralization number of the crude or reduced crude after the liquid phase treating operation. Preferably, the distillates obtained are neutral, and it has been found that the process according to the invention is capable of providing such neutral distillates.

The invention will be further described with reference to the attached drawing, which is a schematic flow-sheet of one embodiment of the process according to the invention. Referring to the drawing, crude oil having neutralization number of about 2.3 mg. of KOH per gram is introduced into extraction zone 11. A basic material, e.g. 50° Bé. aqueous caustic soda, is introduced into zone 11 through line 12. An aqueous solution of an organic solvent, e.g. isopropanol, is introduced into zone 11 through line 13. Suitable agitation means are provided to obtain intimate contacting between the crude and the aqueous treating agent. The treatment is conducted at any suitable temperature, for example room temperature.

The treated crude is removed through line 14. The neutralization number of the treated crude is for example about one mg. of KOH per gram.

An aqueous alcoholic solution of sodium naphthenates is separated from the treated crude by stratification and withdrawn through line 15. In one suitable manner of operation, the solution is passed through line 16 into alcohol recovery zone 17, wherein the solution is subjected to distillation to obtain an aqueous alcohol distillate which is removed through line 18. This distillate contains some lower boiling hydrocarbons, e.g. gasoline hydrocarbons, and is introduced into gasoline recovery zone 19. In zone 19 the lower boiling hydrocarbons are separated from the aqueous alcohol by stratification and removed through line 20. The aqueous alcohol is recycled through line 13 to zone 11.

The residue obtained in the distillation in zone 17 is a concentrated solution of sodium naphthenates in water, and also contains a small amount of alcohol in order to make the solution sufficiently fluid to be readily handled by ordinary pumping and conveying equipment. Fresh alcohol is introduced into zone 11 through line 23 to replace the alcohol withdrawn through line 22. The residue from the distillation in zone 17 is introduced into soap recovery zone 24, which will be more fully described subsequently.

Treated crude from zone 11, after a suitable conventional desalting operation if desired, is introduced into zone 30 wherein it is distilled at atmospheric pressure. The evolved vapors can be contacted with a liquid phase treating agent containing alkali, e.g. sodium hydroxide, introduced through line 31, although as pointed out previously such contacting with alkali can be dispensed with in some instances. If desired, at least a portion of the treating agent removed as subsequently described from zone 35 through line 38 can be introduced through means not shown into zone 30 in place of fresh alkali as indicated at line 31. The vapors, after contact with alkali as described, are fractionated to obtain distillates as indicated at line 32. Any aqueous alcohol which is associated with the hydrocarbons in the distillates can be separated therefrom by means not shown and introduced into alcohol recovery zone 17. The residue from the distillation is removed through line 33. The liquid alkaline treating agent containing sodium naphthenates formed by reaction of sodium hydroxide with naphthenic acids obtained in the vapors, is withdrawn through line 34 and introduced through line 41 into soap recovery zone 24.

The residue removed through line 33 contains hydrocarbons in the lubricating oil boiling range and also contains naphthenic acids boiling in the same range. The naphthenic acids removed in zone 30, if any, are lower molecular weight acids boiling in the naphtha and gas oil ranges. The residue is introduced into zone 35 where it is subjected to distillation. The evolved vapors are contacted with a liquid alkaline treating agent containing alkali, e.g. sodium hydroxide, introduced through line 36. Lubricating oil distillates obtained from the treated vapors are removed through line 37. The liquid alkaline treating agent containing sodium naphthenates formed by reaction of sodium hydroxide with naphthenic acids in the vapors, is withdrawn through line 38 and introduced through line 41 into soap recovery zone 24. Residue from the distillation is removed through line 39.

The naphthenate-containing materials introduced into zone 24 through lines 22 and 41 are contacted in zone 24 with an aqueous solution of a lower alkanol, in the presence of a hydrocarbon diluent for the high molecular weight hydrocarbons introduced into zone 24 through lines 34 and 38. The alcohol and diluent, e.g. petroleum naphtha, aviation alkylate, etc., are introduced through zone 24 as indicated by line 42. Upon intimate contacting, the naphthenates are dissolved in the aqueous alcohol phase, and upon separation of layers, this phase is removed through line 43, and is suitably contacted with a strong acid such as sulfuric acid to liberate naphthenic acids from the naphthenates. Upon separation of layers, the recovered aqueous alcohol is available for re-use, and the naphthenic acids are recovered as a product of the process. The naphtha solution of oil, which is obtained in zone 24 upon separation of layers, can be recycled, after stripping naphtha therefrom, through means not shown into the treating section of zone 35. Alternatively, the oil can be hydrorefined to upgrade it to heavy lubricating oil.

The aqueous alcoholic solution of naphthenates, removed through line 15 from zone 11 can, instead of being introduced into alcohol recovery zone 17, be introduced through line 40 into soap recovery zone 24. In this embodiment, the alcohol in this solution is available for extraction of naphthenates from the liquid treating agents introduced through lines 34 and 38, so that the introduction of alcohol through line 42 can be reduced or eliminated. This manner of operation provides a particularly advantageous utilization of the alcohol in the system. Also, any low molecular weight hydrocarbons in the material introduced through line 40 is advantageously used as a diluent, partially or completely replacing diluent from an external source.

The following example illustrates the invention:

A process is carried out according to the procedure indicated in the drawing. 200 volumes per hour of a blend of 20 percent Quiriquire crude and 80 percent Coastal crude, the blend having A.P.I. gravity of about 24 and acid number of 2.3 mg. of KOH per gram, largely, attributable to naphthenic acids, are introduced into extraction zone 11. 40 volumes per hour of 40% aqueous isopropanol and 0.4 volume per hour of 50° Bé. caustic soda are also introduced into zone 11. The crude removed through line 14 has acid number of about 0.3, indicating extraction of about 85 percent of the acid content of the original crude. The extraction in zone 11 is carried out at atmospheric pressure and room temperature.

5 volumes per hour of water and 10 volumes per hour of 40% isopropanol and the treated crude from zone 11 are introduced into conventional desalting equipment. The treated crude, after desalting, is topped in zone 30 to obtain a residue (about 20 A.P.I.) constituting about 55–65 percent of the crude. The residue is heated to about 650° F. by means not shown and flashed in zone 35 at an absolute pressure of about 70 mm. of Hg. Residue having A.P.I. gravity of about 12 is withdrawn through line 39. The vapors pass through a caustic treating zone wherein they are contacted with a liquid alkaline treating agent having, on the lowest tray of the treating zone, the following composition: oil, 90 volume percent; sodium naphthenates, 8 volume percent; sodium hydroxide, 2 volume percent. This treating agent is in part recycled at 70 volumes per hour to an upper portion of the treating zone and in part introduced at 7 volumes per hour through line 38 into zone 24. 50° Bé. caustic soda at 0.2 volume per hour is introduced through line 36 to replace the treating agent removed through line 38. Distillates having acid number of zero are obtained by rectification of the treated vapors in a rectification zone above the treating zone.

The alcoholic soap removed from zone 11 through line 15 contains about 40 volumes per hour of alcohol and 2.4 volumes per hour of sodium naphthenates. This material is introduced into zone 17. The residue removed from zone 17 through line 22 contains on an hourly basis about 6 volumes of water, 2.4 volumes of sodium naphthenates, and 0.1 volume of alcohol. 0.1 volume per hour of alcohol is added through line 23 as make-up.

The removal of about 85 percent of the naphthenic acids in the original crude by alcoholic alkali treatment reduces by about 85 percent the amount of oil required in the treating agent in the vapor phase treatment, thus increasing the yield of lubricating oil in the vacuum distillation over that which would be obtained if the original crude were charged to the distillation with alkali. The introduction into the vapor phase operation of naphthenates corresponding to 15 percent of the naphthenic acids in the original crude permits obtaining lubricating oil distillates having superior color stability to that obtained in distillation in the absence of naphthenates. The presence of alkali metal hydroxide is also helpful in obtaining good color stability, though in some cases it may not be necessary, for example where substantially all of the naphthenic acids have been removed in the liquid phase operation, and sufficient naphthenates are added in the vapor phase operation to provide satisfactory color stability in the distillates.

It is not definitely known by what mechanism the alkali metal naphthenates present in the vapor phase treatment prevent the poor color stability which the distillates exhibit when naphthenates are absent. The mechanism does not involve reaction with inorganic acids present in the hydrocarbon charge to the vapor phase treatment, since such acids are substantially completely removed in the liquid phase treatment. Frequently, the amount of inorganic acidity in the charge to the liquid phase treatment is only a small proportion of the total acidity. In any event, the reduction in acidity as a result of the liquid phase treatment is greater than the original inorganic acidity, and is preferably sufficient to remove in addition at least 10 percent of the acidity attributable to naphthenic acids.

In place of the alkali metal hydroxide of the preceding example, various other basic materials as previously mentioned can be employed in the liquid phase treatment with generally similar results. Some of these basic materials provide advantages in some instances. Thus, ammonia for example is advantageous in that ammonium naphthenates which are formed can be present in small amount in the hydrocarbon products of the liquid phase treatment without producing detrimental results. Ammonium naphthenates decompose under the conditions of the vapor phase treatment to form ammonia and naphthenic acids, so that no substantial amount of naphthenates remains in the residue from the vapor phase treatment. In this embodiment, the liquid alkaline treating agent in the vapor phase treatment should contain alkali metal hydroxide to react with the naphthenic acids formed by decomposition of ammonium naphthenates.

The invention claimed is:

1. Process for refining petroleum which comprises: contacting in liquid phase a charge stock containing naphthenic acids and selected from the group consisting of crude petroleum and reduced crude petroleum with a 30 to 50 weight percent aqueous solution of a lower alkanol in the presence of 0.2 to 2 millimoles of an alkali metal hydroxide per 100 volumes of said charge stock per unit of neutralization number of said charge stock in mg. of KOH per gram, the amount of said solution being 10 to 60 volume percent based on said charge, thereby to obtain a product having neutralization number which is 0.1 to 0.9 times the acid number of said charge stock; vaporizing a portion of the product to obtain vapors containing naphthenic acids; contacting the vapors with a liquid alkaline treating agent containing alkali metal hydroxide thereby to react said naphthenic acids with alkali metal hydroxide; and recovering distillates from the vapors thus treated.

2. Process according to claim 1 wherein liquid alkaline treating agent, after contact with said vapors, is contacted with an aqueous solution of a lower alkanol, thereby to extract alkali metal naphthenates from the treating agent.

3. Process according to claim 2 wherein alkanol solution from the liquid phase contacting, which solution contains alkali metal naphthenates, is contacted with said liquid alkaline treating agent, after contact with said vapors, thereby to extract alkali metal naphthenates from the treating agent and enrich the alkanol solution in alkali metal naphthenates, and wherein the alkanol solution enriched in alkali metal naphthenates is separated from the hydrocarbon contained in said treating agent.

4. Process according to claim 1 wherein alkanol solution from the liquid phase contacting, which solution contains alkali metal naphthenates, is distilled to recover an aqueous alkanol distillate and as residue a concentrated alkali metal naphthenate solution containing a small amount of alkanol, and said residue and said liquid alkaline treating agent after contact with said vapors, are contacted with an aqueous solution of a lower alkanol, thereby to extract alkali metal naphthenates from the treating agent and the residue 5. Process according to claim 4 wherein hydrocarbons distilled with the aqueous alkanol are separated from said distillate.

6. Process for refining petroleum which comprises: contacting in liquid phase a charge stock containing naphthenic acids and selected from the group consisting of crude petroleum and reduced crude petroleum with an aqueous solution of an oxygen-containing organic solvent, containing a base reactive with naphthenic acids, thereby to react at least 10 weight percent of said naphthenic acids with the base; separating the treated petroleum phase from the aqueous phase containing the reaction products of naphthenic acids with base; vaporizing a portion of the treated petroleum; contacting the vapors with a liquid alkaline treating agent containing sufficient alkali to react with any naphthenic acids in the vapors and containing alkali metal naphthenates in amount corresponding to 10 to 90 weight percent of the naphthenic acids in the charge stock; and recovering distillates from the vapors thus treated.

7. Process according to claim 6 wherein: said charge stock has neutralization number within the approximate range from 1.5 to 6 mg. of KOH per gram; the product of said contacting in liquid phase has reduced neutralization number within the approximate range from 0.5 to 3 mg. of KOH per gram; and the product of contacting with said treating agent has further reduced neutralization number within the approximate range from 0 to 0.5 mg. of KOH per gram.

8. Process according to claim 6 wherein said base is ammonia.

References Cited in the file of this patent

UNITED STATES PATENTS

| | | |
|---|---|---|
| 2,658,027 | Hoover | Nov. 3, 1953 |
| 2,769,768 | Fierce et al. | Nov. 6, 1956 |